(12) United States Patent
Choi et al.

(10) Patent No.: US 7,493,243 B2
(45) Date of Patent: Feb. 17, 2009

(54) METHOD AND SYSTEM OF REAL-TIME GRAPHICAL SIMULATION OF LARGE ROTATIONAL DEFORMATION AND MANIPULATION USING MODAL WARPING

(75) Inventors: Min Gyu Choi, Seoul (KR); Hyeong Seok Ko, Seoul (KR)

(73) Assignee: Seoul National University Industry Foundation, Bongchun-dong, Gwanak-Gu, Seoul (KR)

( * ) Notice: Subject to any disclaimer, the term of this patent is extended or adjusted under 35 U.S.C. 154(b) by 164 days.

(21) Appl. No.: 11/318,158

(22) Filed: Dec. 23, 2005

(65) Prior Publication Data

US 2006/0139347 A1 Jun. 29, 2006

Related U.S. Application Data

(60) Provisional application No. 60/639,386, filed on Dec. 27, 2004.

(51) Int. Cl.
*G06F 17/10* (2006.01)
(52) U.S. Cl. .................... 703/2; 703/6; 345/419
(58) Field of Classification Search .............. 703/2, 703/6, 13; 345/419
See application file for complete search history.

(56) References Cited

U.S. PATENT DOCUMENTS 6,157,747 A * 12/2000 Szeliski et al. ............. 382/284

6,612,393 B2 * 9/2003 Bohner et al. .............. 180/405
2002/0050179 A1 * 5/2002 Buescher et al. .......... 73/865.6
2006/0037409 A1 * 2/2006 Ichige ........................ 73/862

OTHER PUBLICATIONS

Choi et al., M. Modal Warping: Real-Time Simulation of Large Rotational Deformation and Manipulation, IEEE Transactions on Visualization and Computer Graphics, vol. 11, No. 1, Jan./Feb. 2005, pp. 91-101.*
Starner et al., T. Mind-Warping: Towards Creating a Compelling Collaborative Augmented Reality Game, Proceedings of the 5th Int. Conf. on Intelligent User Interfaces, Jan. 2000, pp. 256-259.*
Barbic et al., J. Real-Time Subspace Integration for St. Venant-Kirchhoff Deformable Models, ACM Transactions on Graphics (TOG), ACM SIGGRAPH 2005 Papers, Jul. 2005, pp. 982-990.*
James et al., D. DyRT: Dynamic Response Textures for Real Time Deformation Simulationwith Graphics Hardware, ACM Transactions on Graphics (TOG), Proceedings of the 29th Annual Conf. on Computer Graphics and Interactive Techniques, Jul. 2002, pp. 582-585.*

(Continued)

*Primary Examiner*—Russell Frejd
(74) *Attorney, Agent, or Firm*—Park Law Firm; John K Park

(57) ABSTRACT

A real-time simulation method and system for large deformations is provided in which the rotational component of an infinitesimal deformation is identified, and linear modal analysis is extended to track that component. Small rotations occurring at the nodal points are integrated. By implementing both position and orientation constraints, shape of a deformable solid is manipulated by dragging/twisting a set of nodes. Large bending and/or twisting deformations is simulated.

26 Claims, 13 Drawing Sheets

OTHER PUBLICATIONS

S. Capell, S. Green, B. Curless, T. Duchamp and Z. Popovic. Interactive Skeleton-Driven Dynamic Deformations. 586-593. Copyright 2002 by the Association for Computing Machinery, Inc.

G. Debunne, M. Desbrun, M. P. Cani and Alan H. Barr. Dynamic Real-Time Deformations Using Space and Time Adaptive Sampling. ACM Siggraph 2001, Aug. 12-17, 2001.

O. Etzmub, M. Keckeisen and W. Straber. A Fast Finite Element Solution for Cloth Modelling. Proceedings of the 11th Pacific Conference on Computer Graphics and Applications (PG'03). Copyright 2003. IEEE.

C. A. Felippa. A Systematic Approach to the Element-Independent Corotational Dynamics of Finite Elements. College of Engineering, University of Colorado. Jan. 2000.

S. F. F. Gibson and B. Mirtich. A Survey of Deformable Modeling in Computer Graphics. MERL-A Mitsubishi Electric Research Laboratory.

E. Grinspun, P. Krysl and P. Schroder. CHARMS: A Simple Framework for Adaptive Simulation. 281-290. Copyright 2002 by the Association for Computing Machinery, Inc.

K. K. Hauser, C. Shen and J. F. O'Brien. Interactive Deformation Using Modal Analysis with Constraints. EECS, Computer Science Division. University of California, Berkeley. 247-255. Graphics Interface 2003.

D. L. James and K. Fatahalian. Precomputing Interactive Dynamic Deformable Scenes. Carnegie Mellon University. 879-887. Copyright 2003.

D. L. James and D. K. Pai. DyRT: Dynamic Response Textures for Real Time Deformation Simulation with Graphics Hardware. Department of Computer Science, University of British Columbia. 582-585. Copyright 2002 by the Association for Computing Machinery, Inc.

D. L. James and D. K. Pai. BD-TREE: Output-Sensitive Collision Detection for Reduced Deformable Models. 393-398. Copyright 2004.

P. G. Kry, D. L. James and D. K. Pai. EigenSkin: Real Time Large Deformation Character Skinning in Hardware. 153-200. Copyright 2002 by the Association for Computing Machinery, Inc.

R. B. Lehouchq, D. C. Sorensen and C. Yang. ARPACK Users Guide: Solution of Large Scale Eigenvalue Problems by Implicitly Restarted Arnoldi Methods. Draft-Jul. 31, 1996.

M. Muller, J. Dorsey, L. McMillan, R. Jagnow and B. Cutler. Stable Real-Time Deformations. Massachusetts Institute of Technology, Laboratory for Computer Science. 49-54 and 189. Copyright 2002 by the Association for Computing Machinery, Inc.

M. Muller and M. Gross. Interactive Virtual Materials. Copyright by Canadian Human-Computer Communications Society in the Proceedings of Graphics Interface 2004, May 17-19.

J. F. O'Brien and J. K. Hodgins. Graphic Modeling and Animation of Brittle Fracture. GVU Center and College of Computing. Georgia Institute of Technology.

James F. O'Brien, C. Shen and C. M. Gatchalian. Synthesizing Sounds from Rigid-Body Simulations. EECS, Computer Science Division, University of California, Berkeley. Copyright 2002 by the Association for Computing Machinery, Inc.

A. Pentland and J. Williams. Good Vibrations: Modal Dynamics for Graphics and Animation. Computer Graphics, vol. 23, No. 3. 215-221. Jul. 1999.

J. Stam. Stochastic Dynamics: Simulating the Effects of Turbulence on Flexible Structures. Eurographics '97. vol. 16 (1997), No. 3.

D. Terzopoulos and K. Fleischer. Modeling Inelastic Deformation: Viscoelasticity, Plasticity, Fracture. Computer Graphics, vol. 22, No. 4. 269-278. Aug. 1988.

D. Terzopoulos, J. Platt, A. Barr and k. Fleischer. Elastically Deformable Models. Computer Graphics, vol. 21, No. 4. 205-214. Jul. 1987.

D. Terzopoulos and A. Witkin. Deformable Models: Physically Based Models with Rigid and Deformable Components. 41-51. Nov. 1988.

* cited by examiner

METHOD AND SYSTEM OF REAL-TIME GRAPHICAL SIMULATION OF LARGE ROTATIONAL DEFORMATION AND MANIPULATION USING MODAL WARPING

RELATED APPLICATION

This application is a corresponding non-provisional application of U.S. Provisional Patent Application Ser. No. 60/639,386 for "Modal Warping: Real-Time Simulation of Large Rotational Deformation and Manipulation" filed on Dec. 27, 2004.

BACKGROUND OF THE INVENTION

The present invention relates to a method and system of real-time graphical simulation of large rotational deformation and manipulation using modal warping. More particularly, this invention relates to a method and system of real-time graphical simulation of large rotational deformation and manipulation, in which both position and orientation constraints are implemented in a straightforward manner to simulate large bending and/or twisting deformations with acceptable realism.

I. Introduction

Everything in this world deforms. In many objects or creatures, deformation is such a conspicuous characteristic that their synthetic versions look quite unnatural if the deformation process is not properly simulated. Therefore, modeling of deformation is an important aspect of computer animation production. The invention presents a physically-based method and system for dynamic simulation of deformable solids, attached to rigid supports and excited by their rigid motions and/or external forces such as gravity. The proposed technique makes a significant improvement in simulation speed, while maintaining the realism to a sufficient level, even for large deformations.

It is a well-established approach to model elastic solids as continuums and solve their governing equations numerically using finite element methods. When adopting a continuum model, it is necessary to choose the measure of strain that quantifies deformation. Green's strain tensor, which consists of linear terms and a nonlinear term, has been a common choice for large deformations. Unfortunately, time stepping of the resulting nonlinear system can be computationally expensive, hampering its practical use in animation production.

The computational load can be reduced remarkably by employing modal analysis based on a linear strain tensor. In this technique, a set of deformation modes—a small number of principal shapes that can span free vibration of the elastic model—is identified and precomputed. Then, the problem of simulating deformation is transformed to that of finding the weights of the modes, which results in a significant reduction in computational complexity. This technique can also synthesize geometrically complex deformations with negligible main CPU costs on programmable graphics hardware.

However, modal analysis can produce quite unnatural results when applied to bending or twisting deformations of relatively large magnitudes. In particular, the volume of the deformed shape can increase unrealistically, as shown in FIG. 4. These unnatural results are due to the omission of the non-linear term, which is not negligible for such deformations. The invention proposes a new technique that overcomes the above limitations of linear modal analysis. As a result, the proposed technique generates visually plausible shapes of elastodynamic solids undergoing large rotational deformations, while retaining its computational stability and speed. Also, our formulation provides a new capability for orientation constraints, which has not been addressed in previous studies. The use of position/orientation constraints can create interesting animations (Section VI) which would have been difficult if orientation constraints were not provided.

The innovative aspect of our technique lies in the way of handling rotational parts of deformation in the modal analysis framework. To exploit the framework of linear modal analysis, we omit the nonlinear term during the initial setup, which corresponds to precomputing the modal vibration modes at the rest state. When the simulation is run, however, we keep track of the local rotations that occur during the deformation, based on the infinitesimal rotation tensor. Then, at each time step we warp the precomputed modal basis in accordance with the local rotations of the mesh nodes. The rest of the method is basically the same as in linear modal analysis. The above book-keeping operations—tracking local rotations and warping the modal basis—require only a small amount of extra computation. Therefore, our method can simulate dynamic deformations in real-time by employing programmable graphics hardware, but with an extended coverage of deformations.

II. Related Work

Much effort has been devoted to simulating the motion of deformable objects. Past studies in this area have had two central aims: to speed up the simulation and/or increase the realism of the result.

The speed and realism of simulations, which usually trade off each other, are heavily dependent on how the nonlinearities are handled. If realism is important, Green's quadratic strain tensor could be used, which produces realistic results even for large deformations. However, time stepping of the resulting nonlinear system can be computationally expensive. Several methods have been proposed to reduce the computational load of this approach. Lumped mass approximation diagonalizes the mass matrix so that its inverse can be computed efficiently. Further reduction of the computation time can be achieved by employing adaptive methods based on a multi-grid solver, non-nested overlapping layers of unstructured meshes, subdivision of the control lattice, or refinement of basis functions. However, the speed-up achieved by those methods is limited, because they must still deal with the inherent problems resulting from the nonlinearities. The computation time can be greatly reduced by adopting the modal analysis of linear elastodynamics, which omits the nonlinear term. Since Pentland and Williams first introduced this technique to the computer graphics community, it has been used for modeling the dynamic movements of trees in turbulent wind, and for generating sounds corresponding to the behavior of deformable objects. In particular, some researchers showed that the deformation of human skin excited by rigid body motion can be generated in real-time on programmable graphics hardware. They also proposed an output-sensitive technique for collision detections among reduced deformable models. Still another researchers addressed the manipulation constraints, and combined modal analysis with rigid body simulation to deal with free-floating deformable objects. Although modal analysis significantly accelerates the simulation, it generates noticeable artifacts when applied to large deformations due to the linearization. Here we propose a technique that eliminates the linearization artifacts while retaining the efficiency of the modal analysis.

The linearization artifacts observed in simulations based on linear modal analysis arise in large part because linear modal analysis does not account for rotational deformations.

A frame of reference and modeled the deformation relative to that reference frame was introduced by some researchers. Since simulations using the reference frame capture the rotational part of the deformation, they can handle large rotational motions of deformable solids. However, large deformations within the solid are also susceptible to the linearization artifact. To realistically animate articulated deformable characters in a prior art, the character is first divided into overlapping regions, then each region is simulated separately, and finally the results are blended. For nonlinear quasi-static deformations of articulated characters, a modal displacement model equipped with a continuously articulated coordinate system was introduced in a prior art.

To address large relative rotational deformations within a single object, the stiffness warping method that tracks the rotation of each node and warps the stiffness matrix was proposed in a prior art. Our method is similar to their approach in that rotations are handled separately to reduce the linearization artifacts. The intrinsic difference is that, whereas the stiffness warping method is formulated in the original space, our method is formulated in the modal space. This results in a significant speed up in both simulation and visualization by (a) solving decoupled, reduced system of linear equations, and (b) utilizing programmable graphics hardware for vertex updates of large models. However, other prior art is based on node-wise rotation of the stiffness matrix, thus can produce a spurious ghost force when applied to a free-floating deformable object. Currently, our work is focused on a deformable object attached to a rigid support, thus the ghost force effects are suppressed by the constraint force.

Recently, datadriven tabulation of the state space dynamics and dimensional model reduction of the deformed shapes was proposed to simulate large deformations at an interactive speed with visually realistic results. Because the tabulation could not be performed for all possible system responses, they confined user interactions to certain types of movements. They reported that the precomputation for the dinosaur model shown in FIG. 10 took about 30 hours. In comparison, our method is formulated by adding simple extensions to linear modal analysis. As a consequence, it does not entail long precomputation times, nor does it restrict the types of user interactions. However, self-collisions and global scene illumination cannot be precomputed in our method.

Accordingly, a need for the invention has been present for a long time. This invention is directed to solve these problems and satisfy the long-felt need.

SUMMARY OF THE INVENTION

The present invention contrives to solve the disadvantages of the prior art.

An objective of the invention is to provide a method and system of real-time graphical simulation of large rotational deformation and manipulation using modal warping.

Another objective of the invention is to provide a method and system of real-time graphical simulation of large rotational deformation and manipulation, in which both position and orientation constraints are implemented in a straightforward manner to simulate large bending and/or twisting deformations with acceptable realism.

For the purposes, a method for real-time graphical simulation of large rotational deformation and manipulation of mesh nodes mapping an object using modal warping is provided. The method includes the steps of (a) mapping the information of geometry of material points of an object by a mesh of nodes, (b) calculating the change of geometry of the mesh of nodes using a predetermined and limited number of equations of motion by applying modal warping technique to the position and the rotation at each mesh node, and (c) pre-computing time-independent standard modal calculations and looking up the results of pre-computing.

The step of mapping includes the step of mapping each material points of the object into a mesh of a predetermined geometrical shape of nodes of a predetermined number. The mesh includes a tetrahedral mesh.

The step of calculating includes the steps of (a) decomposing an infinitesimal deformation into a strain and a rotation, (b) computing the position change of each node by solving equations of motion for the selected dominant modes by decoupling the displacement field of each node into basic modes, and selecting dominant modes, and (c) computing the orientation change of each node and reflecting the displacement into the rotation by modal warping technique.

The decomposition gives a differential relation as $da = dx + \epsilon dx + \omega dx = dx + \epsilon dx + \theta \hat{w} \times dx$, wherein x denotes a position of a material point, wherein a(x) stands for a new position due to a subsequent deformation, wherein u(x) is called a displacement field, wherein $a(x) = x + u(x)$, wherein $\epsilon$ is an infinitesimal strain tensor and $\omega$ is an infinitesimal rotation tensor.

The infinitesimal strain tensor is defined by $$\varepsilon = \frac{1}{2}(\nabla u + \nabla u^T),$$

wherein $\nabla u$ is a Jacobian of u and T stands for the transpose of a matrix produced by turning rows into columns and vice versa. The infinitesimal rotation tensor is defined by $$\omega = \frac{1}{2}(\nabla u - \nabla u^T) = \frac{1}{2}(\nabla xu)x \equiv wx,$$

wherein w is a rotation vector that causes rotation of the material points at and near x by angle $\theta = |w|$ about the unit axis $\hat{w} = w/|w|$.

The movement of each node is described by a governing equation for a finite element model. The governing equation is given by $M\ddot{u} + C\dot{u} + Ku = F$, wherein u is a displacement field, M, C, and K are the mass, damping, and stiffness matrices, and F is vector that represents the external forces acting on the nodes, wherein the displacement field, u, is added to the original position to obtain a new position of the nodes corresponding to material points. The matrices are independent of time under the assumption of Rayleigh damping, wherein the matrix C is represented by a linear combination of the matrices M and K; $C = \xi M + \zeta K$, wherein $\xi$ and $\zeta$ are scalar weighting factors.

The step of decoupling includes the step of solving a generalized eigenvalue problem, $K\Phi = M\Phi\Lambda$, such that $\Phi^T M \Phi = I$ and $\Phi^T K \Phi = \Lambda$, wherein $\Phi$ and a diagonal matrix $\Lambda$ is the solution matrices of the generalized eigenvalue problem, wherein the columns of $\Phi$ form a basis of 3n-dimensional space, wherein n is the number of nodes, wherein the displacement field u can be expressed as a linear combination of the columns: $u(t) = \Phi q(t)$, wherein q(t) is a vector containing the corresponding modal amplitudes as its components, wherein n is the number of mesh nodes, wherein the governing equation is decoupled by substitution of $u(t) = \Phi q(t)$ into the governing equation and then premultiplying $\Phi^T$ to the governing equation $M_q \ddot{q} + C_q \dot{q} + K_q Q = \Phi^T F$.

The step of selecting dominant modes includes the step of examining the eigenvalues of the modes.

The step of computing the position change includes the steps of (a) computing the decoupled individual components independently and (b) combining by linear superposition.

The step of computing orientation change includes the steps of (a) expressing the rotational part, w(t), of the motion of each node as a product of a modal rotation matrix, $\Psi$, and the vector containing the modal amplitudes of the displacement field of each node, wherein the modal rotation matrix ($\Psi$) is given by a product of a global matrix (W) and the modal displacement matrix ($\Phi$), wherein the global matrix (W) is given such that the product of the global matrix (W) and the displacement field (u(t)) gives the composite vector (w(t)), the rotational part as $w(t)=W\Phi q(t)=\Psi q(t)$, wherein the global matrix (W) is an assembly of $W_e$ of all elements, wherein $W_e$ is defined by $$w_e(x) = \frac{1}{2}(\nabla x) H_e(x) u_e \equiv W_e u_e,$$

wherein $u_e$ is a vertex displacement of a tetrahedron and the displacement of material point x is given by $u(x)=H_e(x)u_e$, wherein $H_e(x)$ is the linear shape function of the element, and (b) using the precomputed modal rotation matrix ($\Psi$) that is constant over time.

The step of reflecting the displacement into the rotation includes a step of integrating the product of the rotation matrix, $R_i(t)$, and the differential displacement, $\dot{u}_i^L(t)dt$, over the time for each node i and assembling the displacements for all nodes into $$u(t) = \int_0^t R(\tau)\dot{u}^L(\tau)d\tau,$$

wherein the rotation matrix represents the orientation of a local coordinate frame at time t, {i} (t) and the differential displacement is of the i-th node is measured from {i} (t–dt) at time t–dt.

The step of integrating includes a step of converting the governing equation, $M\ddot{u}+C\dot{u}+K(u)u=F$, into a form, $M\ddot{u}^L+C\dot{u}^L+Ku^L=R^TF$, that can be solved for the displacement field in the local coordinate frame, $u^L$.

The step of converting includes steps of (a) premultiplying both sides of $M\ddot{u}+C\dot{u}+K(u)u=F$ with the transpose of rotation matrix, $R^T$, and (b) applying the assumptions of commutativity in fine meshes and warped stiffness, wherein the assumption of commutatively in fine meshes is $R^TM \approx MR^T$ and gives $R^TM\ddot{u} \approx MR^T\ddot{u} = M\ddot{u}^L + MR^T\dot{u}^L$ by differentiating both sides of $$u(t) = \int_0^t R(\tau)\dot{u}^L(\tau)d\tau,$$

wherein the second term, $MR^T\dot{u}^L$, is the Coriolis force resulting from the rotational movements of the local coordinate frames, wherein the assumption of warped stiffness approximates the nonlinear elastic forces in terms of linear elastic forces in the local coordinate frames as $K(u)u \approx RKu^L \Leftrightarrow R^TK(u)u \approx Ku^L$ and resolves the forces in the global coordinate frame. The Coriolis force includes a negligible force compared to gravity for moderate rotational movements.

The step of integrating includes steps of reducing the governing equation in the local coordinate frame $M\ddot{u}^L+C\dot{u}^L+Ku^L=R^TF$ into a set of decoupled ordinary differential equations (ODEs), $M_q\ddot{q}+C_q\dot{q}+K_qq=\Phi^T(R^TF)$, in terms of modal vectors in the local coordinate frame, q(t) defined by $u^L(t)=\Phi q(t)$, wherein q(t) is used instead of $q^L(t)$ for readability. The decoupled ODEs are solved numerically using semi-implicit integration, wherein the modal displacement vector and its first derivative are given by $q^k=\alpha q^{k-1}+\beta \dot{q}^{k-1}+\gamma (R^{k-1}\Phi)^TF^{k-1}$, $\dot{q}^k=h^{-1}[(\alpha-I)q^{k-1}+\beta \dot{q}^{k-1}+\gamma (R^{k-1}\Phi)^TF^{k-1}]$, wherein $\alpha$, $\beta$, and $\gamma$ are diagonal matrices, the i_th components of which are respectively $$\alpha_i = 1 - \frac{h^2 k_i}{d_i}, \beta_i = h\left(1 - \frac{hc_i + h^2 k_i}{d_i}\right), \gamma_i = \frac{h^2}{d_i}.$$

The numerical semi-implicit integration includes a step of taking a quasi-static approach that ramps q(t) from 0 to $q^k$ at each time step k, wherein the modal displacement vector, modal rotation vector, and displacement field at time step k are given as $$q(t) = \frac{t}{t^k}q^k \ (0 \leq t \leq t^k), w(t) = \frac{t}{t^k}\Psi q^k$$

$$(0 \leq t \leq t^k), u^k = \int_0^{t^k} R(t)\Phi\dot{q}(t)dt = \tilde{R}^k\Phi q^k.$$

The method further includes steps of manipulating (a) position constraints, (b) orientation constraints, (c) mixed constraints, and (d) static position constraints.

The step of manipulating the position constraints includes steps of (a) extracting only the rows for the constrained nodes of a predetermined number $\lambda$ from the modal displacement matrix $\Phi$ to form $\Phi_c$, (b) extracting only the part corresponding to the constrained nodes from the rotation matrix $R^k$ from the quasi-static approach to form $R_c^k$, (c) obtaining a constraint equation $u_c^k=\Phi_c^k q_c^k=R_c^k\Phi_c q_c^k$, (d) obtaining the constrained modal displacement (amplitude) vector as $q_c^k=\alpha q^{k-1}+\beta\dot{q}^{k-1}+\gamma(R^{k-1}\Phi)^T(F^{k-1}+\bar{F}^{k-1})=q_u^k+\gamma(R^{k-1}\Phi)^T\bar{F}^{k-1}$, (e) including the nodes at which forces are exerted (exercised nodes), and (f) obtaining the modal displacement vector $q_c^k=q_u^k+\gamma(R_x^{k-1}\Phi_x)^TF_x^{k-1}$, wherein the constraint force measured in the global coordinate frame is given by $F_x^{k-1}=R_x^{k-1}A_p^+b_p$, wherein $A_p=R_c^k\Phi_c\gamma\Phi_x^T$, $b_p=u_c^k-R_c^k\Phi_c q_u^k$, and $(\cdot)^+$ denotes the pseudo-inverse of a matrix, wherein the force is decomposed into time-dependent and time-independent parts, wherein the time-independent part is precomputed at the constraint initiation stage, wherein $\Phi_x$ is a matrix obtained from Phi by taking only the rows for the exercised nodes and $R_x^{k-1}$ is obtained from $R^{k-1}$ by taking only the part corresponding to the exercised nodes.

The step of manipulating the orientation constraints includes steps of (a) extracting only the constrained nodes from the modal rotation vector to form $w_c^k$ which represent the desired rotations of the constrained nodes at time step k, $w_c^k=\Psi_c q_c^k$, (b) extracting the constrained modal rotation matrix $\Psi_c$ from the modal rotation matrix $\Psi$, and (c) obtaining the modal rotation vector $w_c^k$ using the constraint force $F_x^{k-1}=R_x^{k-1}A_0^+b_0$, wherein the time invariant part of constraint force is precomputed at the constraint initiation stage, wherein $q_c^k$ is a unknown modal amplitude vector, wherein $A_0 = \Psi_c \gamma \Phi_x^T$ and $b_0 = w_c^k - \Psi_c q_u^k$.

The step of manipulating the mixed constraints includes steps of (a) combining the position constraint force and the orientation constraint force employing a task-priority approach in which the position constraints are regarded as the primary task and the orientation constraints as the secondary task or vice versa to get $F_x^{k-1} = R_x^{k-1} \{f_p + [A_0(I - A_p^+ A_p)]^+ [b_0 - A_0 f_p]\}$, and (b) precomputing the time-invariant part, $[A_0(I - A_p^+ A_p)]^+$, in the combined constraint force.

The step of manipulating the static position constraints includes steps of simply omitting the corresponding degrees of freedom in the governing equation and setting the displacements to zero.

A system for real-time graphical simulation of large rotational deformation and manipulation of an object using modal warping including the modules for (a) mapping each material points of the object into a mesh of nodes of a predetermined number, n, (b) decomposing a (infinitesimal) deformation of each material points into a strain and a rotation in terms of an infinitesimal strain tensor and infinitesimal rotation tensor, (c) expressing a displacement field of each node as a linear combination of a basis of the 3n-dimensional space, wherein the basis of the 3n-dimensional space are the columns of a modal displacement matrix, a solution matrix ($\Phi$) of the generalized eigenvalue problem ($K\Phi = M\Phi\Lambda$) along with a diagonal matrix ($\Lambda$), (d) taking only dominant m columns of the modal displacement matrix ($\Phi$) by examining the eigenvalues in order to reduce the amount of computation, (e) computing the motion components due to individual modes independently and combining the motion components by linear combination, (f) expressing the rotational part (w(t)) of the motion of each node as a product of a modal rotation matrix ($\Psi$) and the vector containing the modal amplitudes of the displacement field of each node, wherein the modal rotation matrix ($\Psi$) is given by a product of a global matrix (W) and the modal displacement matrix($\Phi$), wherein the global matrix (W) is given such that the product of the global matrix (W) and the displacement field (u(t)) gives the composite vector (w(t)), the rotational part, (g) precomputing the modal rotation matrix ($\Psi$), (h) reflecting the rotations in the calculation of the displacement field (u(t)) by integrating the product of the rotation matrix ($R_i(t)$) and the differential displacement $\dot{u}_i^L(t)dt$ over the time, wherein the rotation matrix represents the orientation of a local coordinate frame at time t, $\{i\}$ (t) and the differential displacement of the i_th node is measured from $\{i\}$ (t−dt) at time t−dt, (i) reducing a linear elastodynamic equation in a local coordinate frames into a set of decoupled ordinary differential equations (ODEs), (j) solving the decoupled ODEs numerically, (k) evaluating analytically the integration of rotation to reflect into the displacement field by taking a quasi-static approach that ramps the modal amplitude vector (q(t)) to circumvent an hyteresis effect, and (l) precomputing the time-invariant parts in the constraint equations in the position constraints and orientation constraints at the constraint initiation stage.

The time step is determined by the persistence of vision of human eyes, which is preferably about one thirtieth of a second (1/30 sec). The system is implemented as a stand-alone application.

The advantages of the present invention are: (1) the invention simulates a large deformation with acceptable realism in real-time; (2) the method and system of the invention supports both position and orientation constraints for interactively manipulating of the shape of a deformable object; (3) the invention enables modeling of articulated deformable characters or driving of a keyframe animation by controlling the movement of only a few constrained points.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 9a is three snapshots showing a retargeting of a jumping motion of an articulated character to a jelly box;

FIG. 9b is three snapshots showing an application of the traditional modal analysis to the case of FIG. 9a;

FIG. 9c is a constraint-based motion retargeting to the flubber of a dance motion;

FIG. 9d is a constraint-based retargeting placing one position/orientation constraint and five position constraints;

DETAILED DESCRIPTION OF THE INVENTION

Figure 1:
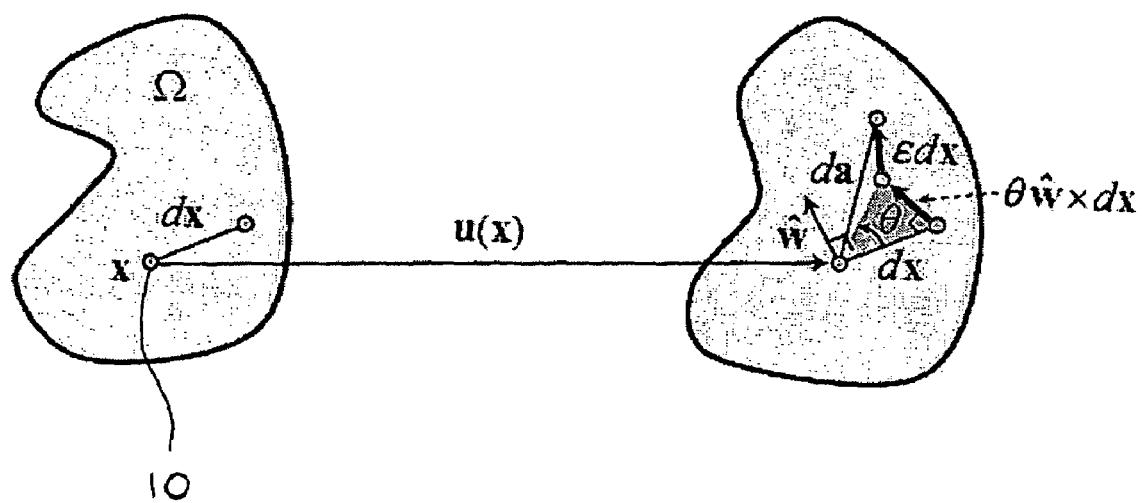
FIG. 1 is a schematic diagram showing the kinematics of infinitesimal deformation.

The U.S. Provisional Patent Application Ser. No. 60/639, 386 and the paper, IEEE Transactions on Visualization and Computer Graphics, Volume 11, No. 1 (January 2005), pp. 91-101, by the applicants are incorporated by reference into this disclosure as if fully set forth herein.

III. Rotational Part in a Small Deformation

The nonlinear term in the strain tensor is responsible for the appearance and disappearance of rotational deformations. However, because the strain tensor used in the present work does not include the nonlinear term, a straightforward modal analysis will not generate such phenomena, and will therefore give rise to visual artifacts for large deformations.

Even though a linear strain tensor does not properly model the rotational deformation, fortunately, investigating the kinematics of deformation provides a clue to lessen such an inability; In fact, it has been generally known that every infinitesimal deformation can be decomposed into a rotation followed by a strain. This finding forms the basis of the technique proposed here. Specifically, at every time step of the deformation simulation, we first identify the (small) rotations occurring over the material points, and then integrate the effects of those rotations to obtain the deformed shape.

This section commences with an investigation of the kinematics of infinitesimal deformation to show how such deformations can be decomposed into a strain and a rotation. We then show how this decomposition can be used to extend modal analysis so that it keeps track of rotations, while still retaining the basic framework of modal analysis. The method for integrating the effects of rotations will be presented in the next section.

A. Kinematics of Infinitesimal Deformation

Before introducing the decomposition of infinitesimal deformations, we first define the necessary notations. Suppose that $x \in R^3$ denotes the position of a material point of an elastic solid in the undeformed state, which moves to a new position $a(x)$ due to a subsequent deformation. To focus on the displacements caused by the deformation, we make use of the displacement field, $u: R^3 \to R^3$, such that $$a(x)=x+u(x), x \in \Omega,$$

where $\Omega$ is the domain of the solid. Then, differentiating both sides of the above equation with respect to x gives a differential relation that gives the position to which a material point neighboring x will be mapped by the deformation:

$$da=(I+\nabla u)dx, \quad (1)$$

where $\nabla u$ is the Jacobian of u. We are interested in decomposing $\nabla u$.

The infinitesimal strain tensor $\epsilon$, which measures the change in the squared length of dx during an infinitesimal deformation (i.e., $|\nabla u| \ll 1$), is defined by $$\varepsilon = \frac{1}{2}(\nabla u + \nabla u^T).$$

Noting that $$\frac{1}{2}(\nabla u + \nabla u^T)$$

is a meaningful quantity, we can decompose $\nabla u$ as $$\nabla u = \frac{1}{2}(\nabla u + \nabla u^T) + \frac{1}{2}(\nabla u - \nabla u^T) = \varepsilon + \omega. \quad (2)$$

Interestingly, the skew-symmetric tensor $\omega$ is closely related to the curl of the displacement field, $\nabla \times u$. In fact, $\omega$ can be rewritten as $$\omega = \frac{1}{2}(\nabla u - \nabla u^T) = \frac{1}{2}(\nabla \times u)x \equiv wx, \quad (3)$$

where $z\times$ denotes the standard skew symmetric matrix of vector z. Therefore, $$w = \frac{1}{2}(\nabla \times u)$$

can be viewed as a rotation vector that causes rotation of the material points at and near x by angle $\theta=|w|$ about the unit axis $\hat{w}=w/|w|$. $\omega$ is called the infinitesimal rotation tensor.

By substituting (2) and (3) into (1), we obtain $$da=dx+\epsilon dx+\theta \hat{w} \times dx,$$

which shows that an infinitesimal deformation consists of a strain and a rotation. This decomposition, illustrated in FIG. 1, has the practical benefit that, for small deformations, it is possible to keep track of the rotation of each material point by calculating the curl of the displacement field, $$w = \frac{1}{2}(\nabla \times u).$$

E. Extended Modal Analysis

This section presents how we extend the conventional modal analysis so that it keeps track of the rotation experienced by each material point during deformation. First, we present a brief introductory description of modal analysis and finite element methods.

The governing equation for a finite element model is $$M\ddot{u}+C\dot{u}+Ku=F, \quad (4)$$

where u(t) is a 3n-dimensional vector that represents the displacements of the n nodes from their original positions, and F(t) is a vector that represents the external forces acting on the nodes. The mass, damping, and stiffness matrices M, C, and K are independent of time and are completely characterized at the rest state, under the commonly adopted assumption (Rayleigh damping) that $C=\xi M+\zeta K$, where $\xi$ and $\zeta$ are scalar weighting factors.

Modal Displacement. In general, M and K are not diagonal, and thus (4) is a coupled system of ordinary differential equations (ODEs). Let $\Phi$ and a diagonal matrix $\Lambda$ be the solution matrices of the generalized eigenvalue problem, $K\Phi=M\Phi\Lambda$, such that $\Phi^T M \Phi=I$ and $\Phi^T K \Phi=\Lambda$. Since the columns of $\Phi$ form a basis of the 3n-dimensional space, u can be expressed as a linear combination of the columns:

$$u(t)=\Phi q(t). \quad (5)$$

Here, $\Phi$ is the modal displacement matrix, of which the i-th column represents the i-th mode shape, and q(t) is a vector containing the corresponding modal amplitudes as its components. By examining the eigenvalues we can take only dominant m columns of $\Phi$, significantly reducing the amount of computation. In the following, $\Phi$ denotes the 3n×m submatrix formed by the above procedure.

Substitution of (5) into (4) followed by a premultiplication of $\Phi^T$ decouples (4) as $$M_q\ddot{q}+C_q\dot{q}+K_q q=\Phi^T F, \qquad (6)$$

where $M_q=I$, $C_q=(\xi I+\zeta\Lambda)$, and $K_q=\Lambda$ are now all diagonal. $\Phi^T F$ is called the modal force. The above decoupling allows the motion components due to individual modes to be computed independently and combined by linear superposition.

Modal Rotation. We now develop a procedure to represent the rotational part, $w(t)$, in terms of $q(t)$. $w(t)$ is a 3n-dimensional vector formed by concatenating all of the 3-dimensional rotation vectors, each of which is formed by taking the curl of the displacement field u at each node, as described in Section III-A.

For simplicity, we use linear tetrahedral elements in (4). Let $u_{e,j}$ ($j \in [1, 4]$) be the vertex displacement of a tetrahedron $\Omega_e$, and let $u_e=[u_{e,1}^T|u_{e,2}^T|u_{e,3}^T|u_{e,4}^T]$. Then, the displacement of material point $x \in \Omega_e$ is given by $u(x)=H_e(x)u_e$, where $H_e(x)$ is the linear shape function of the element. Substituting this into (3) yields the rotation vector for x:

$$w_e(x) = \frac{1}{2}(\nabla x)H_e(x)u_e \equiv W_e u_e. \qquad (7)$$

Note that, because $H_e(x)$ is a linear function of x, $W_e$ is constant, and thus $W_e(x)$ is uniform over $\Omega_e$. For the rotation vector of a node, we use the average of the rotation vectors of all the tetrahedra sharing the node.

Based on the above discussion, we can now assemble $W_e$ of all the elements to form the global matrix W such that $Wu(t)$ gives the composite vector $w(t)$ that we are looking for. When assembling W, 3×3 submatrices of $W_e$ for the rotation vectors of all the tetrahedra sharing a node are not summed up but averaged. Finally, expanding $u(t)$ with (5) gives $$w(t)=W\Phi q(t)\equiv \Psi q(t). \qquad (8)$$

Both W and $\Phi$ are characterized by the deformable mesh at the rest state, and are thus constant over time. Therefore we can precompute $\Psi$. Equation (8) shows that, as in the displacement (Equation (5)), we can represent the rotational component of deformation in terms of $q(t)$. We call $\Psi$ the modal rotation matrix. It should be noted that both of the modal matrices are meaningful only for moderately small deformations.

IV. Integration of Rotational Parts

Equation (8) provides an efficient way to keep track of the rotations occurring at each node over time. However, such rotations are not yet reflected in the calculation of the displacement field $u(t)$. Therefore, simulations based on (5), (6), and (8) in Section III-B will not produce proper rotational deformations. In this section, we develop a method to integrate the effect of the rotational part into the calculation of $u(t)$.

To accommodate large deformations, the stiffness matrix K in (4) should be replaced by $K(u)$. Therefore, we must deal with a governing equation of the form, $$M\ddot{u}+C\dot{u}+K(u)u=F. \qquad (9)$$

Figure 2:
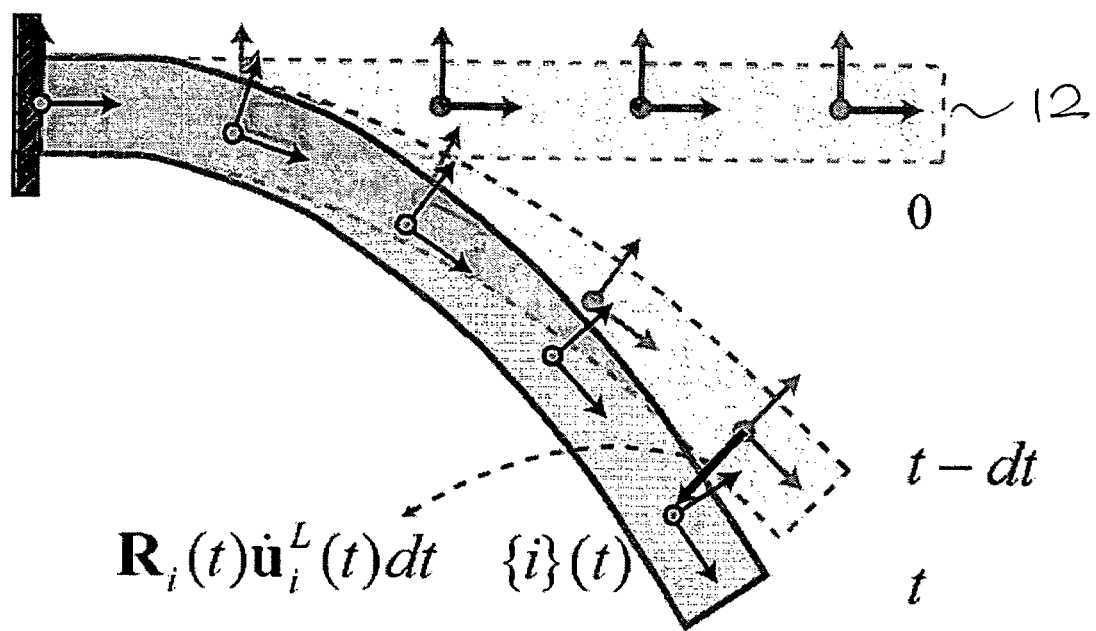
FIG. 2 is a diagram showing local coordinate frames attached to the nodes.

Let $u(t)=[u_1^T(t) \ldots u_n^T(t)]^T$. Then the i-th 3-dimensional vector $u_i(t)$ represents the displacement of the i-th node from its original position, measured in the global coordinate frame. In order to measure the local rotations with respect to the global coordinate frame, we embed a local coordinate frame {i} at each node i as shown in FIG. 2, such that at the initial state 12 it is aligned with the global coordinate frame. We use the notation {i} (t) to refer to the local coordinate frame at time t.

Let $R_i(t)$ be the rotation matrix representing the orientation of {i}(t), and $\dot{u}_i^L(t)$ dt be the differential displacement of the i-th node at time t–dt measured from {i}(t–dt). Then, the finite displacement $u_i(t)$ measured from the global coordinate frame is given by $$u_i(t) = \int_0^t R(\tau)\dot{u}_i^L(\tau)\,d\tau. \qquad (10)$$

The above procedure must be carried out for every node. Therefore, we form the block-diagonal matrix $R=[\delta_{ij}R_i]$, where $1 \leq i, j \leq n$ and $\delta_{ij}$ is the Kronecker delta. Then, n equations with the form of (10) can be assembled into a single equation, $$u(t) = \int_0^t R(\tau)\dot{u}^L(\tau)\,d\tau. \qquad (11)$$

This equation shows how the effect of the rotations occurring at the nodal points can be accumulated. The remainder of this section describes the procedure used to compute the above integration.

A. Modal Analysis in Local Coordinate Frames

Equation (11) tells us that, instead of Solving (9) for u, we need to convert the equation into a form that can be solved for $u_L$. By premultiplying both sides of (9) with $R^T$, we obtain $$R^T[M\ddot{u}+C\dot{u}+K(u)u]=R^T F. \qquad (12)$$

The following two assumptions must then be made to Convert (12) to the form shown in (16).

Assumption I: Commutativity in Fine Meshes. We assume that the mesh being simulated is sufficiently fine that the approximation, $$R^T M \approx M R^T \qquad (13)$$

is valid.

The error associated with the above approximation is related to the orientational differences between neighboring local coordinate frames. To prove that this error decreases as the orientational differences decrease, we need to examine the structure of M. For the simple case where M is a lumped diagonal mass matrix, the approximation error is zero regardless of R. The proof for the general case is given in Appendix I. Experimental results showed that the approximation error did not significantly impact the visual realism of the simulation, even for coarse meshes.

Differentiating both sides of (11) with respect to time, we obtain $\ddot{u}=R\ddot{u}^L+\dot{R}\dot{u}^L$. Therefore, $$R^T M\ddot{u} \approx M R^T \ddot{u}=M\ddot{u}^L+MR^T\dot{R}\dot{u}^L, \qquad (14)$$

where $MR^T\dot{R}\dot{u}^L$ is the Coriolis force resulting from the rotational movements of the local coordinate frames. If the rotational movements occur at a moderate rate, the Coriolis force is negligible compared to gravity. Thus, we omit the Coriolis force in the subsequent formulation. When the coordinate frame movements occur at an extreme rate, the Coriolis force can be taken into account as an external force by replacing RHS of (18) with $\Phi^T(R^TF)-\Phi^T(MR^T\dot{R}\Phi\dot{q})$. However, the above replacement did not produce noticeable differences for the examples shown in Section VI.

Assumption II: Warped Stiffness. We assume that the nonlinear elastic forces can be approximated by $$K(u)u \approx RKu^L \Leftrightarrow R^TK(u)u \approx Ku^L, \quad (15)$$

which measures linear elastic forces in the local coordinate frames, but resolves them in the global coordinate frame.

The above assumption is similar to the stiffness warping, where $K(u)u \approx RK(R^Ta-x)$. Unlike element-based rotation of elastic forces, node-based rotation can yield a non-zero total momentum of elastic forces, and thus a spurious ghost force on a free-floating deformable object. However, the effects of such a ghost force are suppressed by the constraint force acting on a rigid support.

Now, we are ready to approximate (12) by a linear equation for modal analysis in the local coordinate frames. Substituting (14) and (15) into (12), we obtain $$M\ddot{u}^L + C\dot{u}^L + Ku^L = R^TF, \quad (16)$$

where we use the proportional damping $C = \xi M + \zeta K$. This linear elastodynamic equation for $u^L$ is same as (4), except that the external force acting on each node needs to be pre-rotated in accordance with its local coordinate frame. Therefore, it is straightforward to reduce (16) into a set of decoupled ODEs. The modal displacement matrix $\Phi$ obtained in Section III-B gives the relationship $$u^L(t) = \Phi q(t), \quad (17)$$

where we use the notation $q(t)$ instead of $q^L(t)$ for the sake of readability. Based on this relationship, we can replace $u^L$ in (16) with $\Phi q(t)$, and, after premultiplying both sides of the same equation with $\Phi^T$, we obtain $$M_q\ddot{q} + C_q\dot{q} + K_qq = \Phi^T(R^TF). \quad (18)$$

The above decoupled ODEs can be solved numerically using semi-implicit integration. We employed semi-implicit integration for m decoupled equations because it was easy to implement and the derivation for manipulation constraints became simple. We have not encountered numerical instabilities with a time step size of h=1/30 second in all our experiments. The possible over-damping effects can be attenuated using theta-integration or Newmark integration. Alternatively, one can use either IIR digital filters or the closed form solution. Finally, we note that all these approaches have the same time complexity because m equations are already decoupled. By Manipulating (18), we obtain the following expressions for $q^k = q(t^k)$ and $\dot{q}^k = \dot{q}(t^k)$:

$$q^k = \alpha q^{k-1} + \beta \dot{q}^{k-1} + \gamma (R^{k-1}\Phi)^T F^{k-1},$$

$$\dot{q}^k = h^{-1}[(\alpha-I)q^{k-1} + \beta \dot{q}^{k-1} + \gamma(R^{k-1}\Phi)^T F^{k-1}], \quad (19)$$

where $\alpha$, $\beta$, and $\gamma$ are diagonal matrices, the i_th components of which are respectively $$\alpha_i = 1 - \frac{h^2 k_i}{d_i}, \; \beta_i = h\left(1 - \frac{hc_i + h^2 k_i}{d_i}\right), \; \gamma_i = \frac{h^2}{d_i},$$

in which h is the time step size, $d_i = m_i + hc_i + h^2 k_i$ with $m_i$, $c_i$, and $k_i$ representing the diagonal entries of $M_q$, $C_q$, and $K_q$, respectively.

B. Formulation of Modal Warping

We now need to evaluate (11) for the finite displacement $u^k$ at the time step k. When a straightforward numerical integration is employed, accumulation of the numerical errors can give rise to an hysteresis effect such that the deformable solid does not return to the initial state even after all the external forces disappear.

To circumvent such an hysteresis effect, we analytically evaluate (11) by taking a quasi-static approach that ramps q(t) from 0 to $q^k$ at each time step k. That is, we use $$q(t) = \frac{t}{t^k}q^k, \; 0 \le t \le t^k. \quad (20)$$

Then, the history of w(t), which determines that of R(t), is also represented as a linear function.

$$w(t) = \frac{t}{t^k}\Psi q^k, \; 0 \le \tau \le t^k. \quad (21)$$

Now, R(t) can be obtained by simply converting w(t) into the 3n×3n block-diagonal rotation matrix. Finally, we exploit $\dot{u}^L(t) = \Phi\dot{q}(t)$ from (17) and $$\dot{q}(t) = \frac{1}{t^k}q^k$$

from (20) to analytically evaluate (11) as follows:

$$u^k = \int_0^{t^k} R(t)\Phi\dot{q}(t)dt = \tilde{R}^k\Phi q^k, \quad (22)$$

where $$\tilde{R}^k = \int_0^{t^k} R(t)dt.$$

The procedure for computing $R^k$ is given in Appendix II.

Figure 3A:
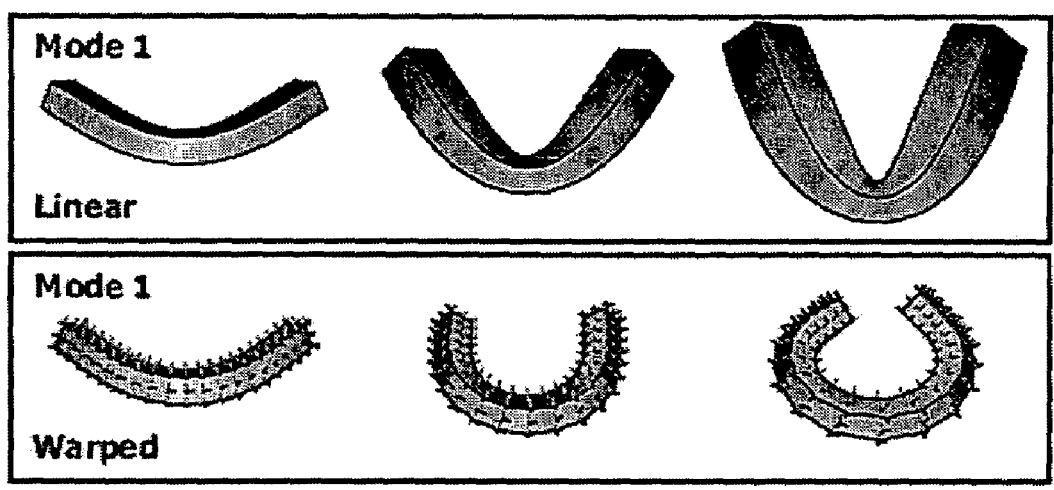
FIG. 3a is snapshots showing an evolution of mode shape in linear modal analysis and modal warping at mode 1.
Figure 3B:
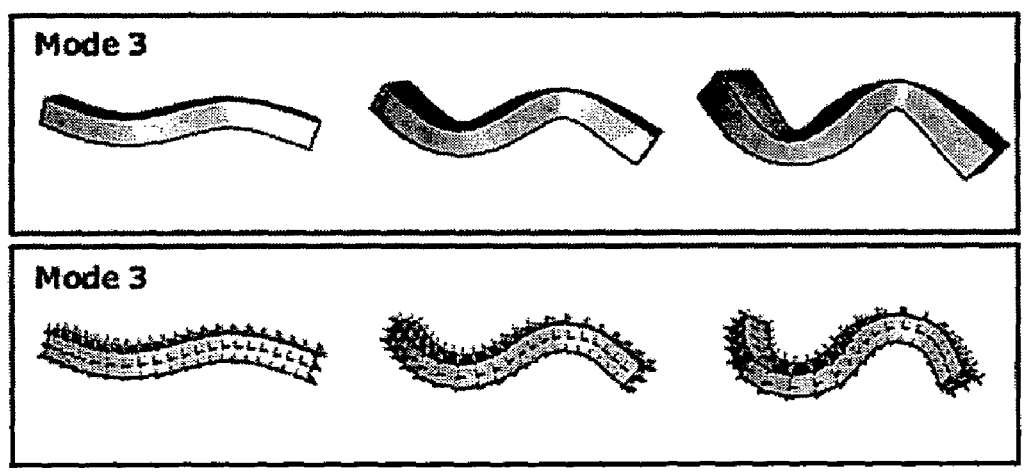
FIG. 3b is snapshots showing an evolution of mode shape in linear modal analysis and modal warping at mode 2.
Figure 3C:
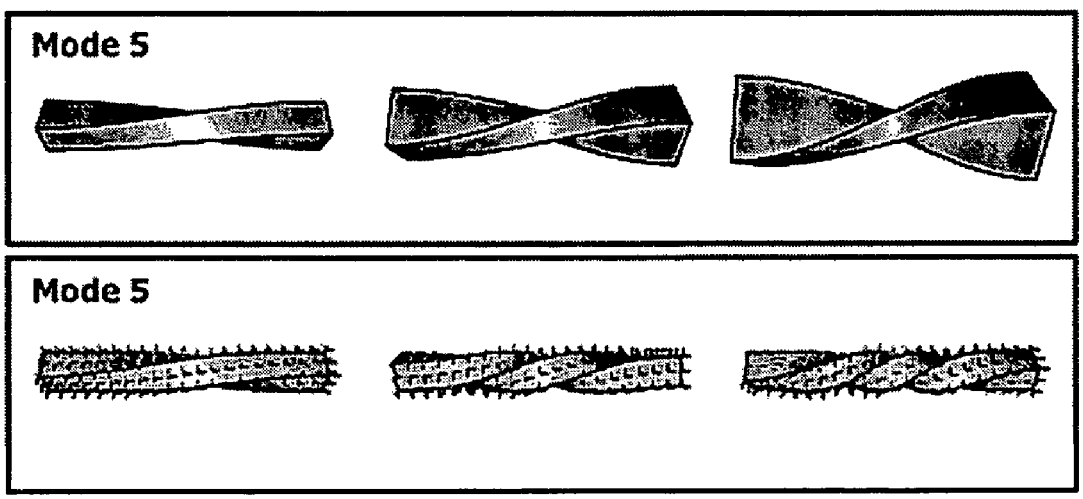
FIG. 3c is snapshots showing an evolution of mode shape in linear modal analysis and modal warping at mode 3.

The above equation implies a new deformation scheme; $\Phi^k = R^k\Phi$ can be regarded as a warped version of the original modal basis $\Phi$. The columns of $\Phi^k$ give the mode shapes at the time step k, in which rotations occurred at the nodal points have been accumulated. FIGS. 3a-3c shows the evolution of three selected mode shapes over time for the case of a bar. The new method works basically in the same way as linear modal analysis, except that it uses a warped modal basis instead of a fixed linear modal basis.

V. Manipulation Constraints

Thus far, we have discussed the dynamics of an unconstrained elastic body. We extend our deformation scheme to cope with manipulation constraints that allow, for example, dragging/twisting of some nodes to certain positions and/or orientations (see FIG. 7). We formulate these manipulation constraints as hard constraints. Constraints for velocity and acceleration can be developed in a similar way. Note that orientation constraints for a deformable body have not been addressed in previous studies. Such constraints are possible in our formulation because it explicitly takes into account the mean orientation of each node, based on the infinitesimal strain tensor analysis.

A. Position Constraints

Let $\lambda$ be the number of constrained points, and let $u_c^k$ be the $3\lambda$-dimensional vector consisting of the desired displacements of the constrained nodes at a time step k. Then, the constraint equation can be written as $$u_c^k = \Phi_c^k q_c^k = \tilde{R}_c^k \Phi_c q_c^k, \qquad (23)$$

where $q_c^k$ is the unknown modal amplitude vector, $\Phi_c$ is the $3\lambda \times m$ matrix obtained from $\Phi$ by taking only the rows for the constrained nodes, and $R_c^k$ is the $3\lambda \times 3\lambda$ block-diagonal matrix obtained from $R^k$ by taking only the part corresponding to the constrained nodes. We note that the content of $R^k$ ($R^k$ is its submatrix) used in this section may differ from that of $R^k$ appearing in (22), since extra movements may need to be incurred to realize the constraints. We propose three ways of treating the problem: (a) employ the Newton-Rhapson method; (b) approximate $R_c^k$ from $R^k$ of (22); or (c) use a slightly less accurate version of (22), i.e., $u^k = R^{k-1}\Phi q^k$. Each of these methods has its drawbacks; method (a) can require longer computation times, method (b) can potentially cause oscillations, and method (c) can make the simulation off-phase by one time step. We found method (b) to be a reasonable choice because, during experiments, no noticeable oscillations has been observed. Let the 3n-dimensional vector $\bar{F}^{k-1}$ represent the unknown constraint force measured in the global coordinate frame. Then, $q_c^k$ should satisfy not only (23) but also (19) when this additional force is applied. That is, $$q_c^k = \alpha q^{k-1} + \beta \dot{q}^{k-1} + \gamma (R^{k-1}\Phi)^T \bar{F}^{k-1} + \bar{F}^{k-1}) = q_u^k + \gamma (R^{k-1}\Phi)^T \bar{F}^{k-1}, \qquad (24)$$

where $q_u^k = \alpha q^{k-1} + \beta \dot{q}^{k-1} + \gamma (R^{k-1}\Phi)^T \bar{F}^{k-1}$ is the modal amplitude vector for the unconstrained case, i.e., $q^k$ in (19).

The forces do not need to be exerted only at the constrained nodes, because exerting forces at some unconstrained nodes can still cause the constrained nodes to be positioned at the specified locations. We will refer to the nodes at which forces are exerted as exercised nodes. When we directly drag a set of nodes, for example, the exercised nodes are identical to the constrained nodes. In general, however, they can be different.

Let $\mu$ be the number of exercised nodes. In $\bar{F}^{k-1}$, the portion corresponding to the unexercised nodes should be zero. Let $F_x^{k-1}$ be the $3\mu$-dimensional vector consisting only of the constraint forces acting on the exercised nodes, which can be obtained by removing the 3-dimensional vectors corresponding to the unexercised nodes from $\bar{F}^{k-1}$. Then, we can rewrite (24) in terms of $F_x^{k-1}$, $$q_c^k = q_u^k + \gamma (R_x^{k-1}\Phi_x)^T F_x^{k-1}, \qquad (25)$$

where $\Phi_x$ is the $3\mu \times m$ matrix obtained from $\Phi$ by taking only the rows for the exercised nodes, and the $3\mu \times 3\mu$ block-diagonal matrix $R_x^{k-1}$ is obtained from $R^{k-1}$ by taking only the part corresponding to the exercised nodes. Finally, substituting (25) into (23) and manipulating the resulting expression, we obtain the equation for the constraint force:

$$F_x^{k-1} = R_x^{k-1} A_p^+ b_p, \qquad (26)$$

where $A_p = \tilde{R}_c^k \Phi_c \gamma \Phi_x^T$, $b_p = u_c^k - R_c^k \Phi_c q_u^k$, and $(\cdot)^+$ denotes the pseudo-inverse of a matrix. This constraint force can now be applied to the exercised nodes through (25) to yield the desired modal amplitude vector. We now examine the computational complexity of (26). Since $A_p$ is time-dependent, the pseudo-inverse of $A_p$ must be computed at every time step.

Fortunately, we can decompose $A_p$ into time-dependent and time-independent parts, namely $A_p = (R_c^k)(\Phi_c \gamma \Phi_x^T)$, making it possible to compute its pseudo inverse using $A_p^+ = (\Phi_c \gamma \Phi_x^T)^+(R_c^k)^{-1}$. The first part of $A_p^+$ is time-independent, and hence can be precomputed at the constraint initiation stage. The second part is time dependent and therefore must be computed at runtime; however, this entails only a small computational load because $R_c^k$ is $(3 \times 3)$-block-diagonal.

B. Orientation Constraints

Orientation constraints can be implemented in a similar way to the position constrains. Let $\eta$ be the number of constrained nodes, and let the $3\eta$-dimensional vector $w_c^k$ represent the desired rotations of the constrained nodes at a time step k. Then, the constraint equation can be written as $$w_c^k = \Psi_c q_c^k, \qquad (27)$$

where $q_c^k$ is the unknown modal amplitude vector and $\Psi_c$ is the $3\eta \times m$ matrix obtained from the modal rotation matrix $\Psi$ by taking only the rows corresponding to the constrained nodes. Then, as in the position constraint case, $q_c^k$ should simultaneously satisfy (25) and (27). By manipulating these two equations, we obtain the equation for the constraint force:

$$F_x^{k-1} = R_x^{k-1} A_0^+ b_0, \qquad (28)$$

where $A_0 = \Psi_c \gamma \Phi_x^T$ and $b_0 = w_c^k - \Psi_c q_u^k$. Unlike the position constraint case, $A_0$ is time-invariant so its pseudo-inverse can be precomputed at the constraint initiation stage. Finally, we can apply the above constraint force to the exercised nodes through (25) to obtain the desired modal amplitude vector.

C. Mixed Constraints

When one set of nodes is position-constrained and another (not necessarily disjoint) set is orientation-constrained, the constraint force should simultaneously satisfy both types of constraint. A simple approach would be to use an augmented formulation that combines (26) and (28):

$$F_x^{k-1} = R_x^{k-1} \begin{bmatrix} A_p \\ A_0 \end{bmatrix}^+ \begin{bmatrix} b_p \\ b_0 \end{bmatrix}.$$

However, this approach does not allow precomputation of the pseudo-inverse because $[A_p^T A_0^T]$ is time-dependent.

To isolate the precomputable part, we employ a task-priority approach in which the position constraints are regarded as the primary task and the orientation constraints as the secondary task (or vice versa, depending on the situation). Letting $f_p = A_p^+ b_p$, the constraint force can be written as $$F_x^{k-1} = R_x^{k-1} \{f_p + [A_0(I - A_p^+ A_p)]^+ [b_0 - A_0 f_p]\}, \qquad (29)$$

which causes the solution satisfying the position constraints is found first, and then the solution optimally satisfying the orientation constraints is searched for within the null space of the position constraints. Note that $A_p^+ A_p$ is time-independent because the time-dependent parts cancel each other, and hence $[A_0(I - A_p^+ A_p)]^+$ can be precomputed. Consequently, the only nontrivial computation remaining in the calculation of (29) is to compute the inverse of $R_c^k$, which appears in $f_p = A_p^+ b_p = (\Phi_c \gamma \Phi_c^T)^+(R_c^k)^{-1} b_p$.

D. Static Position Constraints

In the above description of manipulation constraints, every positional or rotational displacement is measured relative to the frame of reference, which was introduced in Section II.

The static position constraints, that makes a set of nodes be fixed at the initial locations with respect to the frame of reference, is not implemented in terms of the manipulation constraints. Constraints of this type are realized by simply omitting the corresponding DOFs in the governing equation and setting the displacements to zero.

VI. Experimental Results

Our deformation scheme is implemented as an Alias® MAYA™ plugin for a Microsoft® Windows$^{XP}$ environment, and also as a stand-alone application to exploit programmable graphics hardware through nVIDIA® Cg and Microsoft® API. Tetrahedral meshes were generated using the public domain software NETGEN. To obtain the m dominant eigenvalues of large sparse square matrices and the corresponding eigenvectors, we used the MATLAB® built-in C++ math function eigs, which is based on the ARPACK eigenvalue solver. All experiments were performed on a PC with an Intel® Pentium® 4 3.2 GHz processor, 1 GB memory, and an nVIDIA® GeForce® FX 5900 Ultra 256 MB graphics card. We used the time step size of h=1/30 second in all experiments reported in this section. Model statistics and performance data are summarized in Table 1.

Comparison to Other Methods

Figure 4:
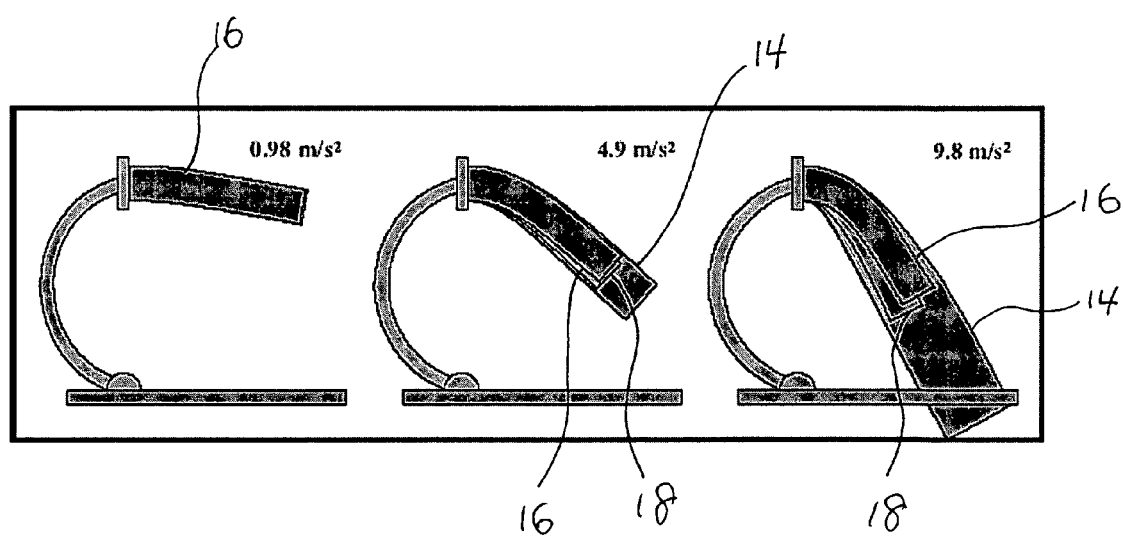
FIG. 4 is comparison diagrams for a bar deformed by modal analysis, by modal warping, and by nonlinear FEM under gravity of different magnitudes.

This experiment is to compare the results generated by linear modal analysis, modal warping, and nonlinear FEM. We ran the three methods to deform a long bar under different gravities. As for the nonlinear, we employed explicit integration and used the time step size h=0.001 seconds for numerical stabilities. FIG. 4 shows the snapshots taken at the equilibrium states of the bar. The bar was deformed by modal analysis 14, by modal warping 16, and by nonlinear FEM 18 under gravity of different magnitudes.

Figure 5:
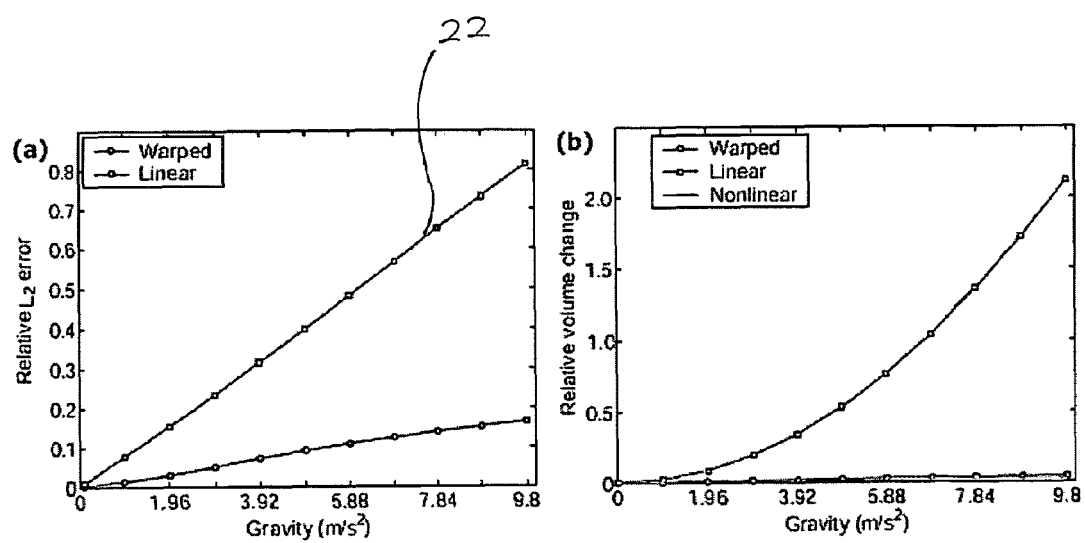
FIG. 5 is graphs for an error analysis of the bar of FIG. 4 for the relative $L_2$ displacement field error and for the relative volume change with respect to the initial volume.

FIG. 5($a$) shows the plot of the relative $L_2$ displacement field error versus gravitational magnitude. We took the result produced by nonlinear FEM as the ground truth. The relative error in modal warping is smaller than that in linear modal analysis although it increases as the gravitational magnitude increases. FIG. 5($b$) is the plot of the relative volume change with respect to the initial volume. It shows that the relative volume change in modal warping is almost identical to that in nonlinear FEM. Even though FIG. 5($a$) shows modal warping 22 produces non-negligible $L_2$ displacement field errors, it was not easy to visually discriminate between the results produced by modal warping and nonlinear FEM, unless the results were seen overlayed. However, the effects due to the volume changes were clearly noticeable.

Figure 6:
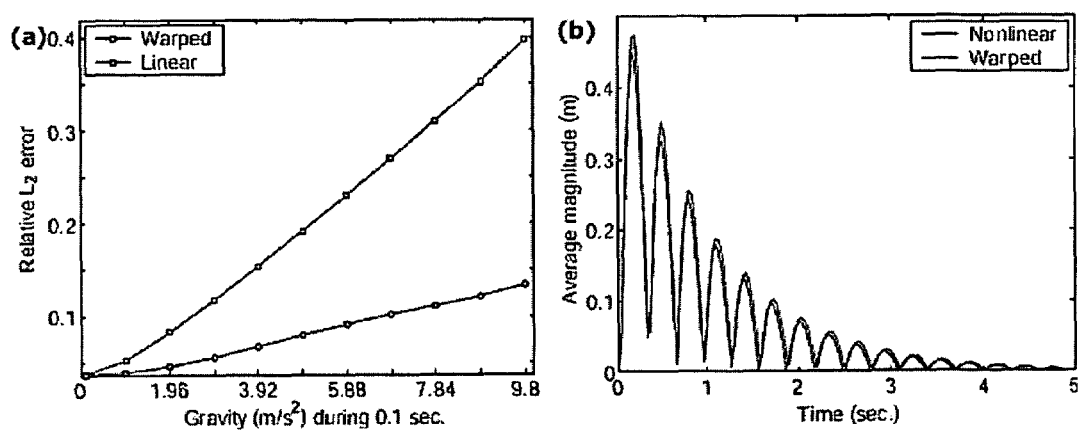
FIG. 6 is graphs for an error analysis of free vibration for (a) the relative L2 displacement field error summed over space and time and for (b) the average magnitude of nodal displacements over time.

We also conducted a dynamic analysis while the bar makes free vibration. We applied the gravity (of different magnitudes as in the above experiments) during only the first 0.1 seconds of the simulation. FIG. 6($a$) shows the plot of the relative $L_2$ displacement field error summed over space and time. FIG. 6($b$) is the time-series plot of the average magnitude of nodal displacements in the case of gravitational magnitude 9.8 m/s$^2$, in which we can observe a subtle difference in the frequency of oscillation. It is interesting to note that, if measured relative to the error of linear modal analysis, the error of modal warping in the dynamic analysis (FIG. 6($a$)) is larger than that in the static analysis (FIG. 5($a$)). It results from the aforementioned difference in the frequency of oscillation.

Figure 7:
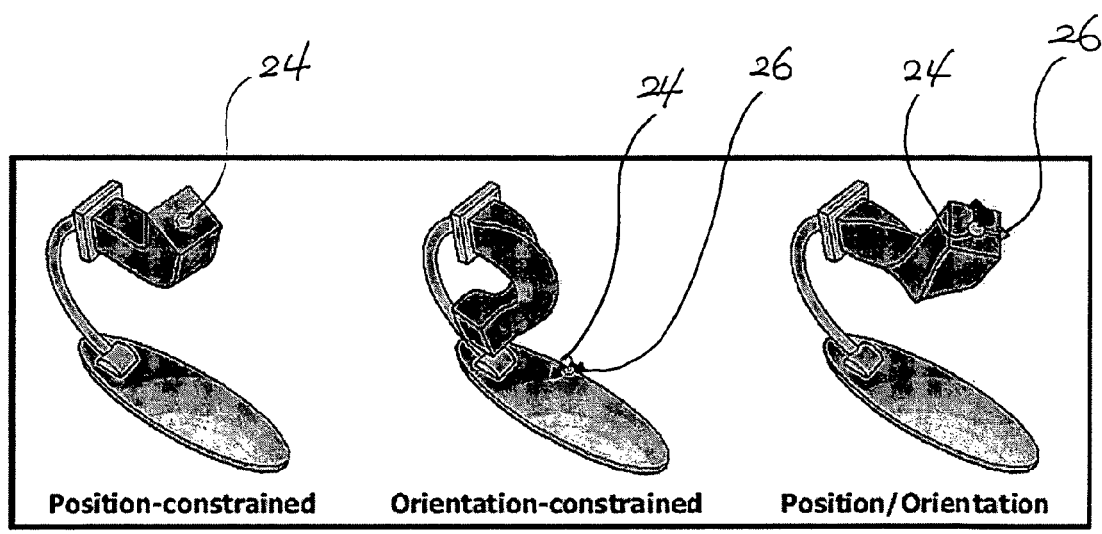
FIG. 7 is a bar manipulated with a position constraint, an orientation constraint, and a position/orientation constraint with a circle representing the position constraints and the axes representing the orientation constraints.

Manipulation Test. This experiment demonstrates the manipulation capability of our technique. FIG. 7 shows, from left to right, the resultant deformations in the cases of only position constraints, only orientation constraints, and both position and orientation constraints. For the case of position constraints, the constrained node was identical to the exercised node. For the case of orientation constraints, however, the set of exercised nodes had to be extended to include nodes neighboring the constrained node. The position constraints are represented by spheres 24 and the orientation constraints are represented by axes 26.

Figure 8:
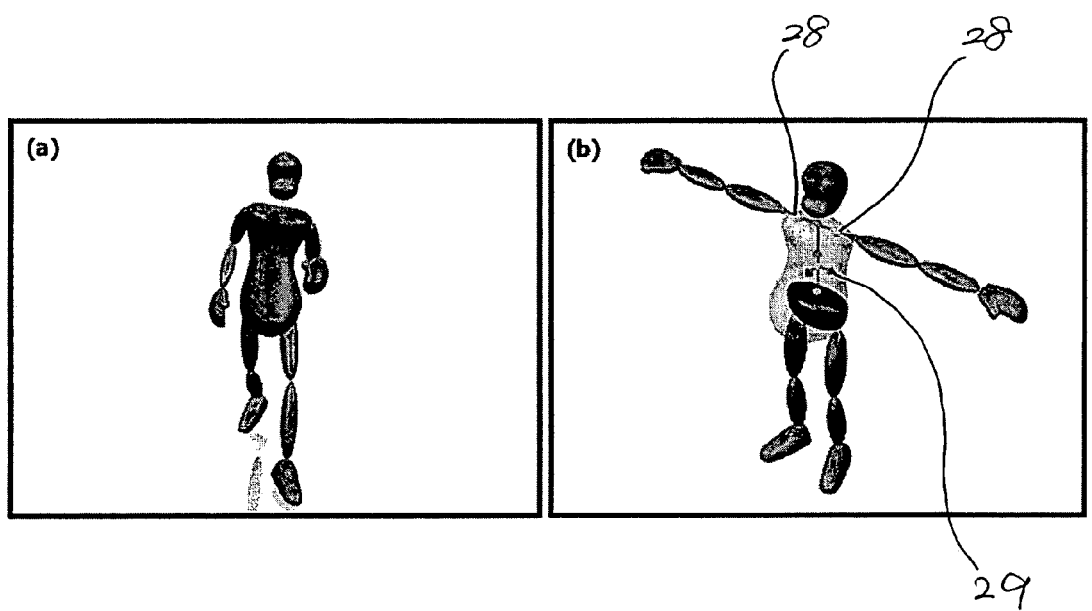
FIG. 8 is a constraint-driven animation of a character with one formable part (the torso)

Manipulation Constraints for Animating Deformable Body Parts. To demonstrate how the manipulation constraints can be used to animate deformable parts of a character, we simulated a character whose only deformable part was its potbellied torso (FIG. 8($a$)). As the character made a dance motion, the potbelly made a dynamic passive deformation, excited by the gross motion of the character. All the mesh nodes contained in the rigid pelvis at the initial setup were static position constrained, and thus their movement coincided with that of the pelvis. As shown in FIG. 8($b$), the deformable solid is attached to the skeleton by two position constraints (the spheres 28) and one position/orientation constraint (the axes 29).

| | | Model statistics | | | | | Constr. | | Pre-computation (sec) | | Computation (sec/fr) | | FPS | |
|---|---|---|---|---|---|---|---|---|---|---|---|---|---|---|
| Example | Fig. | Vertices | Faces | Nodes | Elements | Modes | λ | η | FEM | MA | ODE | Constr. | Maya | Cg |
| Bar | 4 & 7 | 354 | 352 | 99 | 240 | 8 | 1 | 1 | 0.046 | 0.063 | 0.001 | 0.001 | 60.0 | — |
| Potbelly | 8 | 1026 | 1056 | 363 | 1110 | 16 | 3 | 1 | 0.062 | 0.484 | 0.001 | 0.001 | 60.0 | — |
| Jelly Box | 9(a) | 1642 | 1640 | 400 | 1440 | 32 | 2 | 2 | 0.062 | 1.156 | 0.001 | 0.001 | 60.0 | — |
| Flubber | 9(c) | 2802 | 2800 | 552 | 1513 | 64 | 6 | 1 | 0.078 | 2.062 | 0.001 | 0.001 | 60.0 | — |
| Dinosaur | 10 | 28098 | 56192 | 1883 | 5484 | 8 | 1 | 1 | 0.312 | 1.422 | 0.002 | 0.001 | 11.9 | 103.8 |

Figure 9:
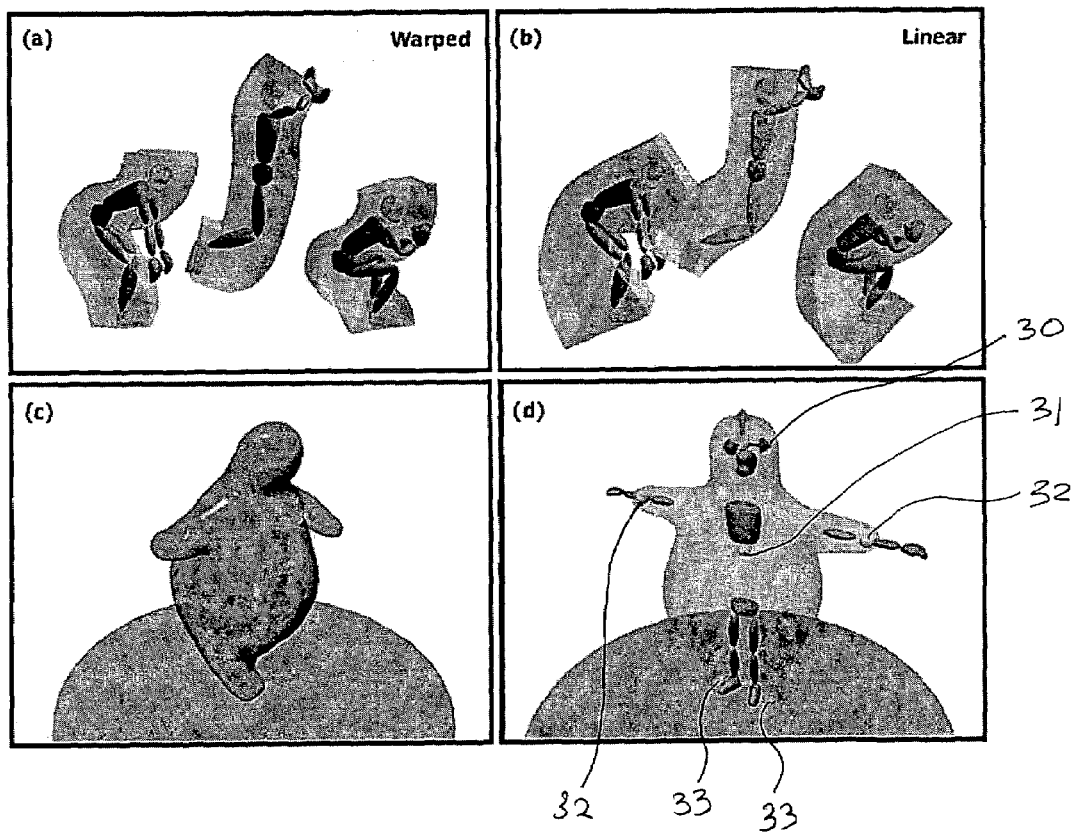

Manipulation Constraints for Motion Retargeting. The manipulation constraints can also be used to retarget a motion of an articulated character to that of a deformable character. To demonstrate this, we consider two examples. In the first example, a jumping motion of an articulated character is retargeted to a jelly box, as shown in FIG. 9($a$). As in the character considered above, the nodes contained in the pelvis are static position constrained. The motion of the jelly box is driven by the movements of the feet and head of the articulated character; to implement this, a node corresponding to the middle of the two feet is selected and position/orientation-constrained to follow the average movement of the feet, and a node corresponding to the forehead is also position/orientation-constrained to follow the movement of the head. Three snapshots taken during this experiment are shown in FIG. 9($a$). For comparison, we also applied the traditional modal analysis to this case (see FIG. 9($b$)).

In the second example, we applied a dance motion to the flubber shown in FIG. 9(c). Because this character has a more articulated shape than that in the previous example, more constraints are required to properly map between the articulated and deformable characters. We placed one position/orientation constraint at the head 30, and five position constraints at the torso 31, elbows 32, and feet 33 (see FIG. 9(d)). For the flubber, we used a larger number of deformation modes (64 modes) than in experiments described above; this was necessary to accommodate the wider range of shape variations due to the increased number of constraints.

Figure 10:
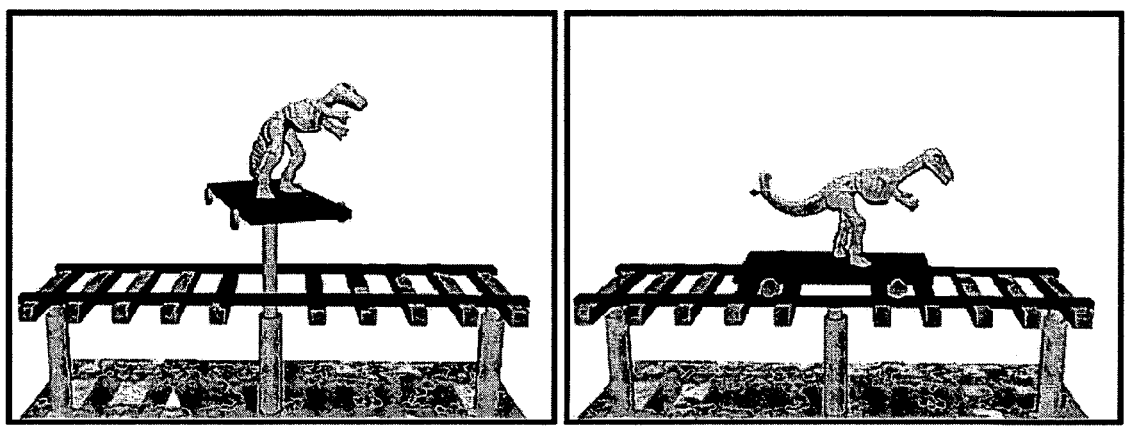
FIG. 10 perspective view showing a dynamic deformation and manipulation of a dinosaur.

Simulation of Large Models. When the modal warping technique is applied to a large model such as the dinosaur model shown in FIG. 10, simulating the deformation is not the bottleneck; surprisingly, the dynamic update of the vertex coordinates for display is the slowest procedure. To achieve real-time simulation of the model, we employed programmable graphics hardware. The main CPU is devoted to simulating the deformable model. The GPU updates each vertex using both the modal amplitude vector supplied from the CPU and the per-vertex data residing in the video memory of the graphics hardware. In our implementation, the per-vertex data consists of the initial position of the vertex along with an additional 2m three-dimensional vectors for the modal displacements and rotations of the vertex. Our method does not require any special considerations on vertex normal corrections because the per-vertex rotation vector is explicitly available to the vertex program (see Appendix III). However, our vertex program requires extra instructions for converting the rotation vector into the rotation matrix. Given the ever-increasing capabilities of graphics hardware technology, we expect that hardware restrictions on the number of instructions will soon be lifted.

To test our approach on a large model, we applied our hardware implementation to the rubber dinosaur model previously used in a prior art. The mesh for finite element modeling consists of 5,484 tetrahedral elements and 1,883 nodal points, and the mesh for the final display consists of 56,192 faces and 28,098 vertices. The total precomputation time for the finite element method and the modal analysis was less than 2 seconds, and the simulation, including the display, ran at about 100 fps. The result was quite realistic, even for cases involving large deformations. Using our method, the types of interactions allowed during runtime did not need to be restricted; for example, the tail of the dinosaur could be manipulated interactively.

Figure 11:
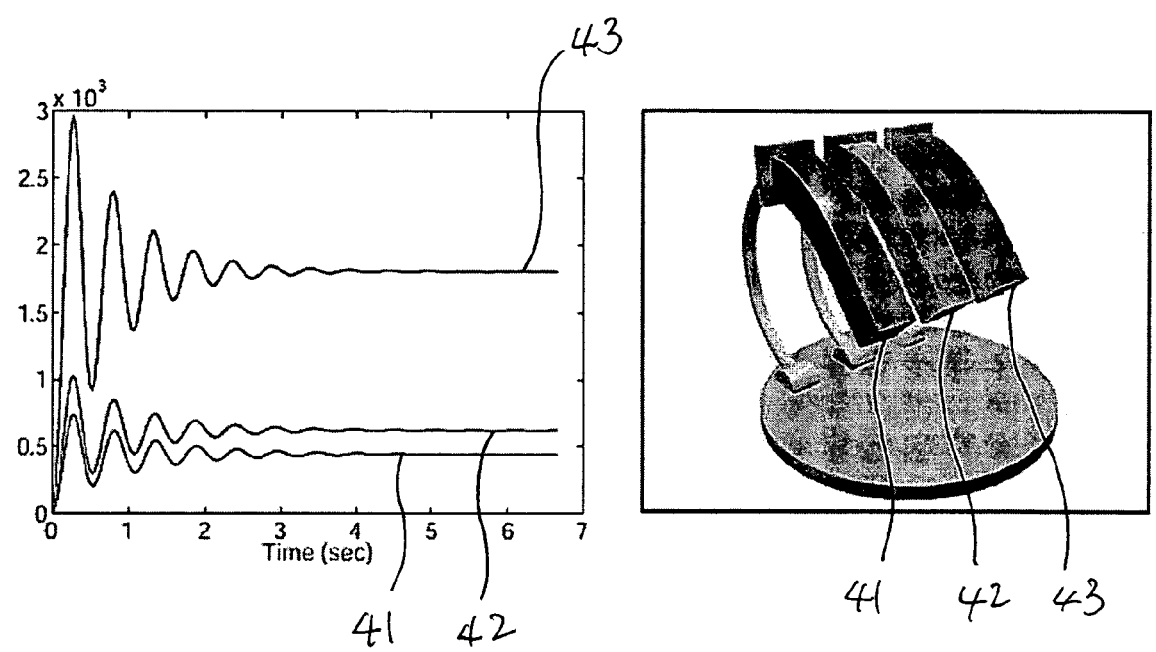
FIG. 11 is a graph showing the approximation error in three different mesh resolutions and perspective views of the corresponding bars.

FIG. 11 shows the three different mesh resolutions: for 11×3×3 41, 19×4×4 42, and 21×5×5 43.

VII. Conclusion

The present work extends traditional linear modal analysis to create a novel deformation technique that combines the merits of this type of analysis, in particular its ability to give real-time performance, with the ability to accommodate large rotational deformations. An interesting feature of our technique is that it supports both position and orientation constraints, and hence could be used for interactively manipulating the shape of a deformable solid. The constraints can also be used for some less obvious but very useful purposes, such as to model articulated deformable characters or to drive a keyframe animation such that the animator controls the movement of only a few constrained points then the technique generates the movement of all the nodal points. We expect the deformation technique proposed here will prove useful in many application areas, including computer games and character animation.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for simulating large rotational deformation and manipulating mesh nodes mapping an object using modal warping comprising the steps of:
    a) mapping the information of geometry of material points of an object by a mesh of nodes;
    b) calculating the change of geometry of the mesh of nodes using a predetermined and limited number of equations of motion by applying modal warping to the position and the rotation at each mesh node;
    c) pre-computing time-independent standard modal calculations;
    d) looking up results of the step of pre-computing;
    e) updating the position and the rotation at each mesh node; and
    f) displaying mesh nodes at the updated positions.

2. The method of claim 1, wherein the step of mapping comprises the step of mapping each material points of the object into a mesh of a predetermined geometrical shape of nodes of a predetermined number.

3. The method of claim 2, wherein the mesh comprises a tetrahedral mesh.

4. The method of claim 1, wherein the step of calculating comprises the steps of:
    a) decomposing an infinitesimal deformation into a strain and a rotation;
    b) computing the position change of each node by solving equations of motion for the selected dominant modes by decoupling the displacement field of each node into basic modes, and selecting dominant modes; and
    c) computing the orientation change of each node and reflecting the displacement into the rotation by modal warping.

5. The method of claim 4, wherein the decomposition gives a differential relation as $$da = dx + \epsilon dx + \omega dx = dx + \epsilon dx + \theta \hat{w} \times dx,$$

wherein x denotes a position of a material point, wherein a(x) stands for a new position due to a subsequent deformation, wherein u(x) is called a displacement field, wherein a(x)=x+u(x), wherein $\epsilon$ is an infinitesimal strain tensor and $\omega$ is an infinitesimal rotation tensor.

6. The method of claim 5, wherein the infinitesimal strain tensor is defined by $$\varepsilon = \frac{1}{2}(\nabla u + \nabla u^T),$$

wherein $\nabla u$ is a Jacobian of u and T stands for the transpose of a matrix produced by turning rows into columns and vice versa.

7. The method of claim 5, wherein the infinitesimal rotation tensor is defined by $$\omega = \frac{1}{2}(\nabla u + \nabla u^T) = \frac{1}{2}(\nabla xu)x \equiv wx,$$

wherein w is a rotation vector that causes rotation of the material points at and near x by angle $\theta=|w|$ about the unit axis $\hat{w}=w/|w|$.

8. The method of claim 4, wherein the movement of each node is described by a governing equation for a finite element model.

9. The method of claim 8, wherein the governing equation is given by $$M\ddot{u}+C\dot{u}+Ku=F,$$

wherein u is a displacement field, M, C, and K are the mass, damping, and stiffness matrices, and F is vector that represents the external forces acting on the nodes, wherein the displacement field, u, is added to the original position to obtain a new position of the nodes corresponding to material points.

10. The method of claim 9, wherein the matrices are independent of time under the assumption of Rayleigh damping, wherein the matrix C is represented by a linear combination of the matrices M and K; $C=\xi M+\zeta K$, wherein $\xi$ and $\zeta$ are scalar weighting factors.

11. The method of claim 9, wherein the step of decoupling comprises the step of solving a generalized eigenvalue problem, $K\Phi=M\Phi\Lambda$, such that $\Phi^T M\Phi=I$ and $\Phi^T K\Phi=\Lambda$, wherein $\Phi$ and a diagonal matrix $\Lambda$ is the solution matrices of the generalized eigenvalue problem, wherein the columns of $\Phi$ form a basis of 3n-dimensional space, wherein n is the number of nodes, wherein the displacement field u can be expressed as a linear combination of the columns: $u(t)=\Phi q(t)$, wherein $q(t)$ is a vector containing the corresponding modal amplitudes as its components, wherein n is the number of mesh nodes, wherein the governing equation is decoupled by substitution of $u(t)=\Phi q(t)$ into the governing equation and then premultiplying $\Phi^T$ to the governing equation $$M_q\ddot{q}+C_q\dot{q}+K_q q=\Phi^T F,$$

where $M_q=I$, $C_q=(\xi I+\zeta\Lambda)$, and $K_q=\Lambda$.

12. The method of claim 11, wherein the step of selecting dominant modes comprises the step of examining the eigenvalues of the modes.

13. The method of claim 11, the step of computing the position change comprises the steps of:
   a) computing the decoupled individual components independently; and
   b) combining by linear superposition.

14. The method of claim 11, the step of computing orientation change comprises the steps of:
   a) expressing the rotational part, $w(t)$, of the motion of each node as a product of a modal rotation matrix, $\Psi$, and the vector containing the modal amplitudes of the displacement field of each node, wherein the modal rotation matrix ($\Psi$) is given by a product of a global matrix (W) and the modal displacement matrix ($\Phi$), wherein the global matrix (W) is given such that the product of the global matrix (W) and the displacement field ($u(t)$) gives the composite vector ($w(t)$), the rotational part as $$w(t)=W\Phi q(t)\equiv\Psi q(t),$$

wherein the global matrix (W) is an assembly of $W_e$ of all elements, wherein $W_e$ is defined by $$w_e(x)=\frac{1}{2}(\nabla x)H_e(x)u_e\equiv W_e u_e,$$

wherein $u_e$ is a vertex displacement of a tetrahedron and the displacement of material point x is given by $u(x)=H_e(x)u_e$, wherein $H_e(x)$ is the linear shape function of the element; and
   b) using the precomputed modal rotation matrix ($\Psi$) that is constant over time.

15. The method of claim 11, wherein the step of reflecting the displacement into the rotation comprises a step of integrating the product of the rotation matrix, $R_i(t)$, and the differential displacement, $\dot{u}_i^L(t)dt$, over the time for each node i and assembling the displacements for all nodes into $$u(t)=\int_0^t R(\tau)\dot{u}^L(\tau)d\tau,$$

wherein the rotation matrix represents the orientation of a local coordinate frame at time t, $\{i\}(t)$ and the differential displacement is of the i-th node is measured from $\{i\}(t-dt)$ at time t−dt.

16. The method of claim 15, wherein the step of integrating comprises a step of converting the governing equation, $M\ddot{u}+C\dot{u}+K(u)u=F$, into a form, $M\ddot{u}^L+C\dot{u}^L+Ku^L=R^T F$, that can be solved for the displacement field in the local coordinate frame, $u^L$.

17. The method of claim 16, wherein the step of converting comprises steps of
   a) premultiplying both sides of $M\ddot{u}+C\dot{u}+K(u)u=F$ with the transpose of rotation matrix, $R^T$; and
   b) applying the assumptions of commutativity in fine meshes and warped stiffness, wherein the assumption of commutativity in fine meshes is $R^T M\approx MR^T$ and gives $R^T M\ddot{u}\approx MR^T\ddot{u}=M\ddot{u}^L+MR^T\dot{R}\dot{u}^L$ by differentiating both sides of $$u(t)=\int_0^t R(\tau)\dot{u}^L(\tau)d\tau,$$

wherein the second term, $MR^T\dot{R}\dot{u}^L$, is the Coriolis force resulting from the rotational movements of the local coordinate frames, wherein the assumption of warped stiffness approximates the nonlinear elastic forces in terms of linear elastic forces in the local coordinate frames as $K(u)u\approx RKu^L\Leftrightarrow R^T K(u)u\approx Ku^L$ and resolves the forces in the global coordinate frame.

18. The method of claim 17, wherein the Coriolis force comprises a negligible force compared to gravity for moderate rotational movements.

19. The method of claim 16, wherein the step of integrating comprises steps of reducing the governing equation in the local coordinate frame $M\ddot{u}^L+C\dot{u}^L+Ku^L=R^T F$ into a set of decoupled ordinary differential equations (ODEs), $M_q\ddot{q}+C_q\dot{q}+K_q q=\Phi^T(R^T F)$, in terms of modal vectors in the local coordinate frame, q(t) defined by $u^L(t)=\Phi q(t)$, wherein q(t) is used instead of $q^L(t)$ for readability.

20. The method of claim 19, wherein the decoupled ODEs are solved numerically using semi-implicit integration, wherein the modal displacement vector and its first derivative are given by $$q^k=\alpha q^{k-1}+\beta\dot{q}^{k-1}+\gamma(R^{k-1}\Phi)^T F^{k-1},$$

$$\dot{q}^k=h^{-1}[(\alpha-I)q^{k-1}+\beta\dot{q}^{k-1}+\gamma(R^{k-1}\Phi)^T F^{k-1}],$$

wherein $\alpha$, $\beta$, and $\gamma$ are diagonal matrices, the i_th components of which are respectively $$\alpha_i=1-\frac{h^2 k_i}{d_i},\ \beta_i=h\left(1-\frac{hc_i+h^2 k_i}{d_i}\right),\ \gamma_i=\frac{h^2}{d_i}.$$

21. The method of claim 20, wherein the numerical semi-implicit integration comprises a step of taking a quasi-static approach that ramps q(t) from 0 to $q^k$ at each time step k, wherein the modal displacement vector, modal rotation vector, and displacement field at time step k are given as $$q(t)=\frac{t}{t^k}q^k,\ 0\le t\le t^k$$

$$w(t)=\frac{t}{t^k}\Psi q^k,\ 0\le t\le t^k$$

$$u^k=\int_0^{t^k} R(t)\Phi\dot{q}(t)dt=\tilde{R}^k\Phi q^k.$$

22. The method of claim 1, further comprises steps of manipulating:
    a) position constraints;
    b) orientation constraints;
    c) mixed constraints; and
    d) static position constraints.

23. The method of claim 22, wherein the step of manipulating the position constraints comprises steps of:
    a) extracting only the rows for the constrained nodes of a predetermined number $\lambda$ from the modal displacement matrix $\Phi$ to form $\Phi_c$;
    b) extracting only the part corresponding to the constrained nodes from the rotation matrix $R^k$ from the quasi-static approach to form $R_c^k$;
    c) obtaining a constraint equation $$u_c^k=\Phi_c^k q_c^k=\tilde{R}_c^k\Phi_c q_c^k;$$

d) obtaining the constrained modal displacement (amplitude) vector as $$q_c^k=\alpha q_c^{k-1}+\beta\dot{q}_c^{k-1}+\gamma(R^{k-1}\Phi)^T(F^{k-1}+\overline{F}^{k-1})=q_u^k+\gamma(R^{k-1}\Phi)^T\overline{F}^{k-1};$$

e) including the nodes at which forces are exerted (exercised nodes); and f) obtaining the modal displacement vector $$q_c^k=q_u^k+\gamma(R_x^{k-1}\Phi_x)^T\overline{F}_x^{k-1},$$

wherein the constraint force measured in the global coordinate frame is given by $\overline{F}_x^{k-1}=R_x^{k-1}A_p^+b_p$, wherein $A_p=R_c^k\Phi_c\gamma\Phi_x^T$, $b_p=u_c^k-R_c^k\Phi_c q_u^k$, and $(\cdot)^+$ denotes the pseudo-inverse of a matrix, wherein the force is decomposed into time-dependent and time-independent parts, wherein the time-independent part is precomputed at the constraint initiation stage, wherein $\Phi_x$ is a matrix obtained from Phi by taking only the rows for the exercised nodes and $R_x^{k-1}$ is obtained from $R^{k-1}$ by taking only the part corresponding to the exercised nodes.

24. The method of claim 22, wherein the step of manipulating the orientation constraints comprises steps of:
    a) extracting only the constrained nodes from the modal rotation vector to form $w_c^k$ which represent the desired rotations of the constrained nodes at time step k $$w_c^k=\Psi_c q_c^k;$$

b) extracting the constrained modal rotation matrix $\Psi_c$ from the modal rotation matrix $\Psi$; and c) obtaining the modal rotation vector $w_c^k$ using the constraint force $\overline{F}_x^{k-1}=R_x^{k-1}A_0^+b_0$, wherein the time invariant part of constraint force is precomputed at the constraint initiation stage, wherein $q_c^k$ is a unknown modal amplitude vector, wherein $A_0=\Psi_c\gamma\Phi_x^T$ and $b_0=w_c^k-\Psi_c q_u^k$.

25. The method of claim 22, wherein the step of manipulating the mixed constraints comprises steps of:
    a) combining the position constraint force and the orientation constraint force employing a task-priority approach in which the position constraints are regarded as the primary task and the orientation constraints as the secondary task or vice versa to get $$\overline{F}_x^{k-1}=R_x^{k-1}\{f_p+[A_0(I-A_p^+A_p)]^+[b_0-A_0 f_p]\};\text{ and}$$

b) precomputing the time-invariant part, $[A_0(I-A_p^+A_p)]^+$, in the combined constraint force.

26. The method of claim 22, wherein the step of manipulating the static position constraints comprises steps of simply omitting the corresponding degrees of freedom in the governing equation and setting the displacements to zero.

* * * * *